United States Patent
Wylie et al.

(10) Patent No.: US 11,017,619 B2
(45) Date of Patent: May 25, 2021

(54) TECHNIQUES TO DETECT VEHICLE ANOMALIES BASED ON REAL-TIME VEHICLE DATA COLLECTION AND PROCESSING

(71) Applicant: Capital One Services, LLC, McLean, VA (US)

(72) Inventors: Stephen Wylie, Carrollton, TX (US); Qiaochu Tang, The Colony, TX (US); Micah Price, Plano, TX (US); Geoffrey Dagley, McKinney, TX (US); Jason Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/544,883

(22) Filed: Aug. 19, 2019

(65) Prior Publication Data

US 2021/0056778 A1    Feb. 25, 2021

(51) Int. Cl.
*G07C 5/08* (2006.01)
*G06N 20/00* (2019.01)
*G07C 5/00* (2006.01)

(52) U.S. Cl.
CPC ............. *G07C 5/085* (2013.01); *G06N 20/00* (2019.01); *G07C 5/0808* (2013.01); *G07C 5/0816* (2013.01); *G07C 5/008* (2013.01)

(58) Field of Classification Search
CPC .... G07C 5/085; G07C 5/0808; G07C 5/0816; G07C 5/008; G06N 20/00
See application file for complete search history.

(56) References Cited

U.S. PATENT DOCUMENTS

| | | | |
|---|---|---|---|
| 5,932,801 A | 8/1999 | Akishita et al. | |
| 7,647,827 B2 | 1/2010 | Pelecanos et al. | |
| 9,779,557 B2 | 10/2017 | Hauser et al. | |
| 9,780,967 B2 | 10/2017 | Sargent et al. | |
| 9,824,511 B2 | 11/2017 | Valeri et al. | |
| 2003/0196492 A1 | 10/2003 | Remboski et al. | |
| 2004/0243292 A1* | 12/2004 | Roy | B60W 50/06 701/36 |
| 2006/0253282 A1 | 11/2006 | Schmidt et al. | |
| 2007/0005202 A1* | 1/2007 | Breed | G07C 5/008 701/29.1 |
| 2008/0004764 A1* | 1/2008 | Chinnadurai | G05B 23/0235 701/31.4 |
| 2009/0177354 A1 | 7/2009 | Agrawal et al. | |

(Continued)

*Primary Examiner* — Adam R Mott
(74) *Attorney, Agent, or Firm* — Kacvinsky Daisak Bluni PLLC

(57) ABSTRACT

Various embodiments may be directed to systems, devices, apparatuses to perform techniques such as determining vehicle data for a plurality of vehicles, wherein the vehicle data may be based on detections made by input devices of a plurality of mobile devices. Embodiments may further include determining vehicle attributes for the plurality of vehicles and environmental data. Embodiments also include training a machine-learning model with the vehicle data, the vehicle attributes, and the environmental data, and the machine-learning model may be trained to detect anomalies associated with vehicles having the at least one of the vehicle attributes. Embodiments may also include a trained machine-learning model to data to detect anomalies associated with a vehicle.

20 Claims, 7 Drawing Sheets

(56) References Cited

U.S. PATENT DOCUMENTS

| | | | |
|---|---|---|---|
| 2013/0317694 A1* | 11/2013 | Merg | G07C 5/008 |
| | | | 701/31.6 |
| 2016/0035152 A1 | 2/2016 | Kargupta | |
| 2016/0163133 A1 | 6/2016 | Ricci | |
| 2018/0315260 A1* | 11/2018 | Anthony | G07C 5/0808 |

* cited by examiner

500

```
┌─────────────────────────────────────────────────┐
│ DETERMINE VEHICLE DATA FOR A PLURALITY OF       │
│ VEHICLES, THE VEHICLE DATA BASED ON DETECTIONS  │
│ MADE BY INPUT DEVICES OF A PLURALITY OF MOBILE  │
│ DEVICES DETECTED WITHIN THE PLURALITY OF        │
│ VEHICLES                                        │
│ 505                                             │
└─────────────────────────────────────────────────┘
                        │
┌─────────────────────────────────────────────────┐
│ DETERMINE VEHICLE ATTRIBUTES FOR THE PLURALITY  │
│ OF VEHICLES, AT LEAST A PORTION OF THE VEHICLE  │
│ ATTRIBUTES FOR THE PLURALITY OF VEHICLES        │
│ RETRIEVED FROM THE AT LEAST ONE DATASTORE       │
│ BASED ON INFORMATION OF THE VEHICLE DATA        │
│ 510                                             │
└─────────────────────────────────────────────────┘
                        │
┌─────────────────────────────────────────────────┐
│ DETERMINE ENVIRONMENTAL DATA ASSOCIATED WITH    │
│ VEHICLE DATA, AT LEAST A PORTION OF THE         │
│ ENVIRONMENTAL DATA RETRIEVED FROM THE AT LEAST  │
│ ONE DATASTORE BASED ON INFORMATION OF THE       │
│ VEHICLE DATA                                    │
│ 515                                             │
└─────────────────────────────────────────────────┘
                        │
┌─────────────────────────────────────────────────┐
│ TRAINE A MACHINE-LEARNING MODEL WITH THE        │
│ VEHICLE DATA, THE VEHICLE ATTRIBUTES, AND THE   │
│ ENVIRONMENTAL DATA, THE MACHINE-LEARNING MODEL  │
│ TRAINED TO DETECT ANOMALIES ASSOCIATED WITH     │
│ VEHICLES HAVING THE AT LEAST ONE OF THE VEHICLE │
│ ATTRIBUTES                                      │
│ 520                                             │
└─────────────────────────────────────────────────┘
```

RECEIVE REAL-TIME VEHICLE DATA FROM A MOBILE DEVICE, THE REAL-TIME VEHICLE DATA ASSOCIATED WITH ONE OR MORE REAL-TIME DETECTIONS MADE BY ONE OR MORE INPUT DEVICES OF THE MOBILE DEVICE
605

---

DETERMINE VEHICLE ATTRIBUTES AND ENVIRONMENTAL DATA ASSOCIATED WITH THE VEHICLE DATA
610

---

DETERMINE A MACHINE-LEARNING MODEL FOR THE REAL-TIME VEHICLE DATA, WHEREIN THE MACHINE-LEARNING MODEL IS TRAINED ON AT LEAST ONE VEHICLE ATTRIBUTE MATCHING ONE OF THE DETERMINED VEHICLE ATTRIBUTES ASSOCIATED WITH THE REAL-TIME VEHICLE DATA
615

---

APPLY THE MACHINE-LEARNING MODEL TO THE REAL-TIME VEHICLE DATA, VEHICLE ATTRIBUTES, AND ENVIRONMENTAL DATA DETERMINE A RESULT
620

---

DETERMINE WHETHER AN ANOMALY IS DETECTED FOR THE VEHICLE IS DETECTED BASED ON THE RESULT OF APPLYING THE MACHINE-LEARNING MODEL TO THE REAL-TIME VEHICLE DATA, VEHICLE ATTRIBUTES, AND ENVIRONMENTAL DATA
625

FIG. 6

TECHNIQUES TO DETECT VEHICLE ANOMALIES BASED ON REAL-TIME VEHICLE DATA COLLECTION AND PROCESSING

BACKGROUND

Detecting issues early with a vehicle is an important part of maintaining and repairing the vehicle. Effective diagnostic tests may detect undesirable operating conditions and anticipate mechanical failures, thereby improving the performance and safety of the vehicle. In recent years, automobiles have been equipped with diagnostic sensors and processing equipment designed to monitor the operation of the vehicle and record faults and other operating parameters. The information may then be downloaded and read by a mechanic servicing a vehicle to help detect problems. Service facilities are required to have expensive computers and specialized equipment to read the devices and sensors of the vehicle. Requiring expensive and specialized equipment all but makes it impossible for the owner of the vehicle to perform at home diagnostics. In addition, vehicle owners typically do not take their vehicles in for repairs and diagnosing until a problem has become bad and expensive parts are required to fix the issue. Early and convenient detection of problems with vehicles may enable vehicle owners to make repairs before they become costly.

SUMMARY

Various embodiments described herein may include one or more devices, apparatuses, systems, components, and so forth to perform the operations of determining vehicle data for a plurality of vehicles, the vehicle data based on detections made by input devices of a plurality of mobile devices detected within the plurality of vehicles. The operations may also include determining vehicle attributes for the plurality of vehicles, at least a portion of the vehicle attributes for the plurality of vehicles retrieved from the at least one datastore based on information of the vehicle data, determining environmental data associated with vehicle data, at least a portion of the environmental data retrieved from the at least one datastore based on information of the vehicle data, and training a machine-learning model with the vehicle data, the vehicle attributes, and the environmental data, the machine-learning model trained to detect anomalies associated with vehicles having the at least one of the vehicle attributes.

Embodiments may also include one or more devices, apparatuses, systems, components and so forth including a computer processor, and a memory to store instructions. The computer processor when executing the instructions cause the computer processor to receive and process vehicle data, environmental data, and vehicle attributes from one or more datastores, wherein the vehicle data, environmental data, and vehicle attributes are associated with a plurality of vehicles, and the vehicle data at least partial based on detections made by input devices of each of a plurality of mobile devices associated with the plurality of vehicles. The computer processor may also determine a plurality of subsets of the vehicle data, environmental data, and vehicle attributes, and each of the plurality of subsets based on at least one vehicle attribute, and train a plurality of machine-learning models, each of the plurality of machine-learning models trained using one of the plurality of subsets, and each of the plurality of machine-learning models to detect anomalies associated with vehicles.

Embodiments may also include one or more devices, apparatuses, systems, components and so forth including a computer processor, and a memory to store instructions. The computer processor when executing the instructions cause the computer processor to receive and process real-time vehicle data from a mobile device, the real-time vehicle data associated with one or more real-time detections made by one or more input devices of the mobile device. The computer processor may also determine vehicle attributes and environmental data associated with the vehicle data, determine a machine-learning model for the real-time vehicle data, wherein the machine-learning model is trained on at least one vehicle attribute matching one of the determined vehicle attributes associated with the real-time vehicle data, and apply the machine-learning model to the real-time vehicle data, vehicle attributes, and environmental data determine a result. Further, the computer processor may also determine whether an anomaly is detected for the vehicle is detected based on the result of applying the machine-learning model to the real-time vehicle data, vehicle attributes, and environmental data.

BRIEF DESCRIPTION OF THE DRAWINGS

FIG. 5 illustrates an example of a processing flow to perform machine-learning operations.

FIG. 6 illustrates an example of a processing flow to detect anomalies.

DETAILED DESCRIPTION

Figure 1:
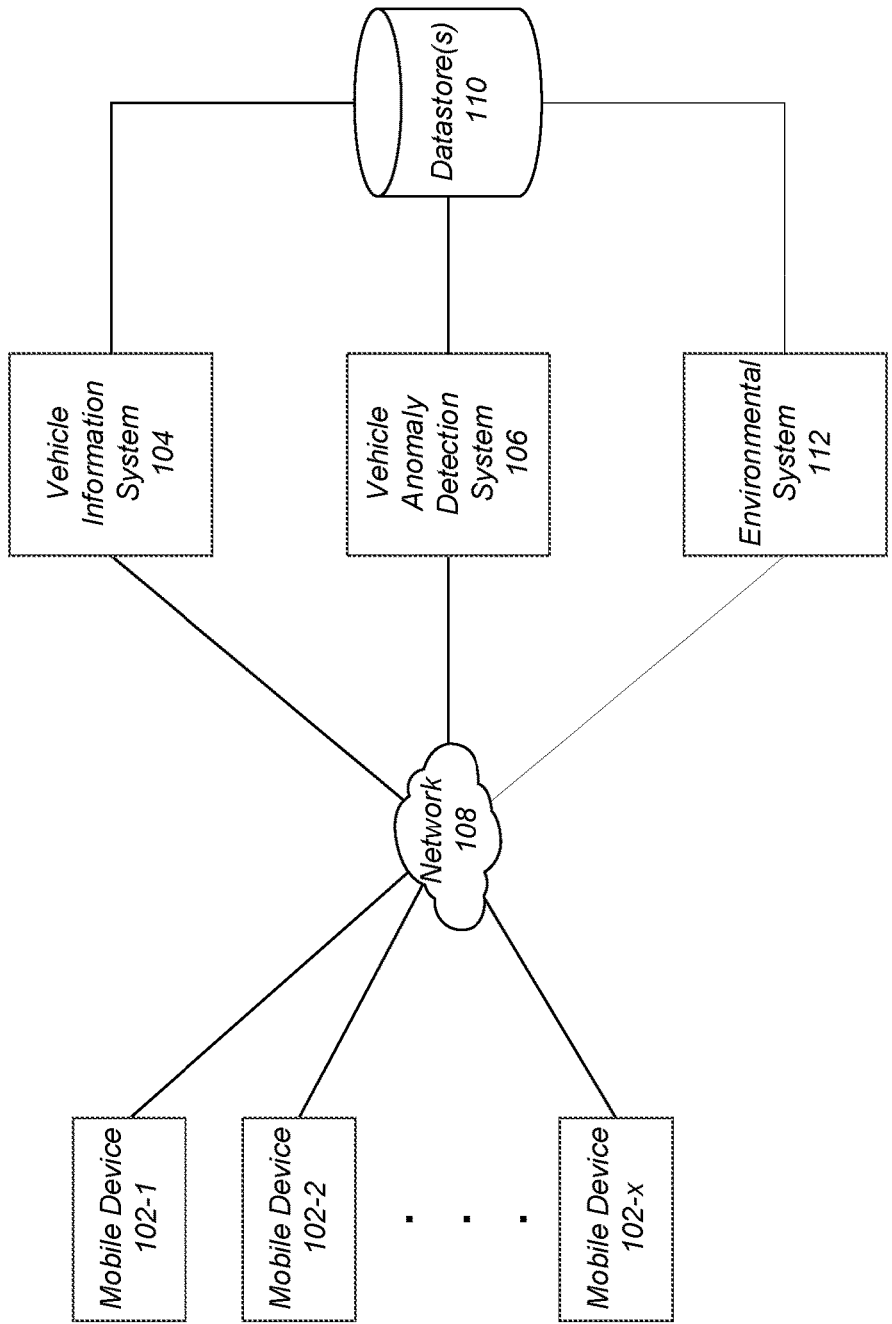
FIG. 1 illustrates an example of a system to detect vehicle anomalies.

Various embodiments may be generally directed to process information and data to detect anomalies or problems with vehicles. For example, embodiments may utilize crowdsourcing techniques, e.g., collecting data from many mobile devices in many vehicles to train machine-learning models. In one example, a trained machine-learning model may be applied to real-time collected data to detect anomalies or problems with a vehicle.

A system may perform crowdsourcing of data and train a model by retrieving and/or determining vehicle data for a plurality of vehicles. In embodiments, the vehicle data may include information and data collected by one or more input devices of mobile devices. The one or more input devices may perform detections to collect the data while the mobile devices are in vehicles, for example.

Further, embodiments include determining data related to the vehicle data, e.g., vehicle attributes for the plurality of vehicles. The vehicle attributes may include a vehicle make, a vehicle model, a vehicle year, vehicle part(s), and vehicle history/repairs for each of the vehicles. In embodiments, a system may determine environmental data associated with the vehicle data. The environmental data may include weather data, road condition data, construction data, etc.

Utilizing the collected data, e.g., the vehicle data, the vehicle attributes, and the environmental data, the system may train one or more models to detect anomalies associated with vehicles. Further, a system may utilize the trained model(s) to detect anomalies based on the real-time vehicle data from a mobile device. In embodiments, the real-time vehicle data may be associated with and/or include data of one or more real-time detections made by one or more input devices of the mobile device while the mobile device is located within a vehicle. The system may also determine vehicle attributes and environmental data associated with the vehicle data collected and provided in real-time. The system may determine a specific machine-learning model for the real-time vehicle data. The machine-learning model may be associated with and/or trained on at least one vehicle attribute matching one of the determined vehicle attributes associated with the real-time vehicle data, for example. The system may apply the machine-learning model to real-time vehicle data, vehicle attributes, and environmental data determine a result. The result may include an indication of a likelihood of an anomaly and/or an indication of what the anomaly may be. Embodiments are not limited in this manner, and these and other details will become more apparent in the following description.

Various embodiments may include one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or fewer elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1 illustrates an example of a computing system 100 to process information and data to detect anomalies or problems with vehicles. As will be discussed in more detail below, embodiments may include collecting data from one or more mobile devices having sensors and input devices, determining vehicles including vehicle attributes corresponding with the collected data, and training one or more models with the collected and based on the vehicle and vehicle attributes. Further, embodiments include collecting real-time data while a user is operating and/or in a vehicle and applying a model to the real-time collected data to detect anomalies.

In the illustrated example, the system 100 includes one or more mobile devices 102-x, where x may be any positive integer, a vehicle information system 104, a vehicle anomaly detection system 106, and an environmental system 112. The devices and systems of system 100 may be coupled via network 108, which may include wired and/or wireless communication links. Further, the vehicle information system 104, vehicle anomaly detection system 106, and the environmental system 112 may be coupled with one or more data store(s) 110. In some instances, the vehicle information system 104, the vehicle anomaly detection system 106, and/or the environmental system 112 may be collocated, e.g., within the same building or building campus. In other instances, the vehicle anomaly detection system 106, the vehicle information system 104, and/or environmental system 112 may include resources (servers, processors, memory, etc.) in different locations. For example, one or more of the vehicle information system 104, the vehicle anomaly detection system 106, and environmental system 112 may include cloud-based computer resources.

Further, system 100 may include any number of datastores 110. For example, each of the vehicle system 104, vehicle anomaly detection system 106, and/or the environmental system 112 may be coupled with different datastores 110. In some instances, one or more of the datastores 110 may be isolated from each other, e.g., only specified systems 104, 106, and/or 112 may access a particular datastore 110. Moreover, embodiments may include different types of data stores. Embodiments are not limited in this manner.

In embodiments, a mobile device 102 may include a device, such as cellular telephone, a smart phone, a personal digital assistant, an Internet of Things device, a wearable device, and so forth. The mobile device 102 includes one or more components to perform the functions described herein. For example, mobile device 102 includes a processor include processing circuitry, storage to store an operating system, programs, and applications, and memory to store instructions for processing by the processing circuitry.

In embodiments, the mobile device 102 may further include one or more sensors and/or input devices to collect information and data, e.g., the vehicle data. For example, the mobile device 102 may include a global position system (GPS) device to determine location data, an accelerometer to determine axis-based motion data, a gyroscope to determine orientation data, a magnetometer to determine magnetic field data (compass), a barometer to determine air pressure data, a proximity sensor to determine distance data, a microphone to determine sound data, and a camera to determine image data. As will be discussed in more detail below, embodiments may include the one or more sensors incorporated into the vehicle and communicating data with the mobile device 102 or directly with the vehicle anomaly detection system 106. In embodiments, the mobile device 102 may communicate the data to the other systems, e.g., the vehicle information system 104 and/or vehicle anomaly detection system 106, via the network 108.

In some instances, the mobile device 102 may process or preprocess the data before communicating it to the vehicle anomaly detection system 106. For example, the mobile device 102 may format the data in a particular manner, sample the data, filter erroneous readings, and apply one or more filters. In one specific example, the mobile device 102 may perform a compression technique (lossless or lossy) on the image or video data captured by the camera. In another example, the mobile device 102 may applya filter to the sound data captured in real-time to filter out sound in a specified frequency range. More specifically, filters may be utilized to filter out noise such as music playing in the background and/or voices of people talking. Embodiments are not limited to these examples.

The mobile device 102 includes one or more communication interfaces to communicate with the other systems, such as a Wireless Fidelity (WiFi) transceiver, a Cellular transceiver, a Bluetooth transceiver, and so forth. In embodiments, the one or more communication interfaces may communicate in accordance with one or more protocols, such as Institute of Electrical and Electronics Engineers (IEEE) 802.11x (a, b, g, n, etc.) to provide secure, reliable, fast wireless connectivity. A Wi-Fi network can be used to connect computers to each other, to the Internet, and to wire networks (which use IEEE 802.3-related media and functions). In another example, the one or more protocols may include the General Packet Radio Service (GPRS) standard, global system for mobile communications (GSM) standard, standards maintained by 3$^{rd}$ Generation Partnership Project (3GPP), Evolved High Speed Packet Access (+HSPA) standard, Long-Term Evolution (LTE), and so forth. Embodiments are not limited to these examples.

The mobile device(s) 102 may include one or more applications including software and instructions capable of monitoring and/or controlling the resources of the mobile device(s) 102, e.g., an operating system, such as Windows®, Chrome®, Linux®, Apple OS®, and so forth. For example, an operating system may enable other software applications to access data from hardware devices, such as the one or more sensors. An application, which may include one or more instructions, may be configured to interact with the hardware devices, collect data from the hardware devices, and communicate with other systems. For example, an application is configured to collect the data from the sensor (s), e.g., sensor data, and provide it to the vehicle anomaly detection system 106.

Moreover, in embodiments, a mobile device 102, including an application, may provide additional information to the systems of system 100. For example, the application may include login and password information associated with an account, e.g., a banking account, and the application may provide one or more of the other systems, e.g., vehicle anomaly detection system 106, the username and password information. The application may provide other information such as whether the mobile device 102 is connected with a Bluetooth device of a vehicle, a Bluetooth device identifier of the vehicle, an identifier of the mobile device 102, etc. and this information may be utilized by the vehicle anomaly detection system 106 to generate models and detect anomalies.

In embodiments, the system 100 includes the vehicle anomaly detection system 106 to perform one or more operations to detect vehicle anomalies and to notify a user of the detected anomalies. The vehicle anomaly detection system 106 may include any number of processors, memory, storage, interfaces, and so forth to perform the operations discussed herein. Moreover, the vehicle anomaly detection system 106 includes software capable of monitoring and/or controlling the resources of the vehicle anomaly detection system 106, e.g., an operating system, such as Windows®, Chrome®, Linux®, Apple OS®, and so forth. Further, the vehicle anomaly detection system 106 may include other software, such as one or more applications including instructions, to perform the operations discussed herein, e.g., generate models, process real-time data, detect anomalies for vehicles, provide information to user devices and users, etc.

The vehicle anomaly detection system 106 collects information and data and generates one or more models to detect anomalies in vehicles. In one example, the vehicle anomaly detection system 106 may receive information and data from the one or more mobile devices 102, e.g., information and data detected and collected by sensors. More specifically, the vehicle anomaly detection system 106 may crowdsource the data from many mobile devices 102, determine information related to the data from the mobile devices 102, a generate models based on the information and data.

In embodiments, the vehicle anomaly detection system 106 may receive the information and data from the mobile devices 102 in real-time, e.g., as it is being collected, periodically, initiated by a user of the mobile device 102, etc. As mentioned, the information and data may include location data, axis-based motion data, orientation data, magnetic field data (compass), air pressure data, distance data (to objects), sound data, and image data In some instances, the vehicle anomaly detection system 106 may determine information and data associated with the data received from the mobile device(s) 102, e.g., from the vehicle information system 104 and/or the environmental information system 112.

In embodiments, the vehicle anomaly detection system 106 may determine and/or retrieve vehicle attributes associated with the information and data collected by the mobile device(s) 102 from the vehicle information system 104. The vehicle anomaly detection system 106 may provide information to the vehicle information system 104 such that it may perform one or more lookups to determine the attributes, e.g., a vehicle make, a vehicle model, a vehicle year, vehicle part(s), vehicle history/repairs, etc., of the vehicle in which the mobile device(s) may be located. For example, the vehicle anomaly detection system 106 may provide the vehicle information system 104 an identifier(s) associated with a mobile device 102, e.g., a name, a device identifier, a phone number, a social media account identifier (Google, Facebook, Instagram, Twitter, etc.), a vehicle identification number (VIN), a Bluetooth identifier, etc. The identifier may be associated with and be used by the vehicle information system 104 to perform one or more lookups, e.g., in datastore 110, to determine the attributes of the vehicle.

The vehicle information system 104 may be system operated by a bank or a lender and may store information about users and vehicles based on loans and/or financing used to purchase the vehicles. The vehicle information system 104 may include any number of devices, computers, processors, memories, etc. to perform operations discussed herein. The vehicle information system 104 may be coupled with the one or more other systems via network 108 and store information and data with respect to the vehicles in a datastore 110. For example, the datastore 110 may store the attributes information and may be associated with the information to perform the lookup, e.g., an identifier, as discussed above.

In embodiments, the vehicle anomaly detection system 106 may gather additional data and information from the environmental system 112. For example, the environmental system 112 may provide information such as weather data, road condition data, construction data, etc. In embodiments, the environmental system 112 may include any number of devices, systems, processors, memory, etc. to perform operations discussed herein. In embodiments, the environmental system 112 may pull and/or retrieve information from one or more other sources, e.g., a weather provider system, a road condition provider, and/or other databases (datastore 110) that may store environmental information. The environmental system 112 may be coupled with the one or more other systems via network 108 and store information and data with respect to the vehicles in a datastore 110.

In embodiments, the vehicle anomaly detection system 106 may provide information to the environment system 112 such that it may perform one or more lookups to determine environmental data. The environmental data may include weather data, road condition data, road type data, etc. and may be utilized by the vehicle anomaly detection system 106 when generating models. In one example, the vehicle detection system 106 may provide the environment system 104 location data that may be used by the environment system 112 to determine weather information, road conditions, traffic, and so forth based on the location data during the time that it was collected. In some instances, the location data may include and/or be associated with a timestamp such that the weather, road conditions, traffic, etc. during a specific time may be determined. In embodiments, the environment system 112 may determine the environmental data and provide it to the vehicle anomaly detection system 106.

In embodiments, the vehicle anomaly detection system 106 may collect and/or gather the information and data from the mobile devices 102, the vehicle attributes from the vehicle information system 104, and the environmental data from the environmental system to generate one or more models that may be used to detect anomalies. The vehicle anomaly detection system 106 may generate one or more machine-learning models, which may be supervised and/or unsupervised machine learning models. For example, the vehicle anomaly detection system 106 may perform supervised machine-learning by utilizing a dataset including data with known results, e.g., with known anomalies and associated collected (sensor) data, vehicle attributes, and environmental data. Thus, the vehicle anomaly detection system 106 may generate or learn a mapping function based on the input variables collected data, vehicle attributes, and environmental data to determine an output variable, e.g., detected vehicle anomalies. The vehicle anomaly detection system 106 may iteratively determine the function by making predictions with the training data with known results. Moreover, the vehicle anomaly detection system 106 may train to detect specific anomalies, bad brakes, worn tires, misfiring engine, potholes, wet conditions, etc.

In other instances, the vehicle anomaly detection system 106 may perform unsupervised machine-learning using a dataset, e.g., collected (sensor) data, vehicle attribute data, and environmental data. In these instances, vehicle anomaly detection system 106 may not know the output data, e.g., the correct/detected anomaly results. The vehicle anomaly detection system 106 may generate an algorithm, e.g., the machine-learning model, based on the input data only. In some instances, the vehicle anomaly detection system 106 may use one or more of clustering and/or association techniques to the dataset when performing unsupervised machine-learning. A clustering technique may be applied to determine the inherent groupings in the dataset, such as vehicle make, vehicle model, vehicle year, trim package, weather conditions, road conditions, and/or any combination thereof. For example, the system 106 may perform machine-learning to determine a correlation between anomalies and specific make, model, year, trims, etc. Thus, an anomaly may be detected across a specific make, model, year, trim, etc. For example, a new cluster of braking behavior may be found and the cluster may correlate with a specific model year or trim package. In another example, the unsupervised machine-learning and cluster may be used to find anomalies in individual cars. For example, if weather data is unavailable, the system 106 may apply an unsupervised machine-learning clustering technique to determine whether a change in tire pressure of a specific vehicle is not or is an anomaly. If the same issue, e.g., low tire pressure, is detected to most or all the vehicles in the same location at a similar time, the issue may weather related and not a specific problem with the vehicle. Embodiments are not limited to these examples.

In embodiments, the vehicle anomaly detection system 106 may detect anomalies with respect to vehicles by applying the trained model(s) to data received from a mobile device(s) 102 in real-time or near real-time. The anomalies indicate that something is wrong with the vehicle, e.g., a mechanical issue, worn tires, bad brakes, etc. In other instances, a detected anomaly may indicate that there is something wrong with a road, e.g., a pothole, a crumbling road, a worn road (does not drain water efficiently), and so forth. An anomaly may also indicate weather conditions and provide as real-time weather feedback based on the mobile device's location.

As similarly discussed above, when generating the model (s), the vehicle anomaly detection system 106 may receive information and data from one or more mobile device(s) 102. The information and data may include sensor data collected by sensors and identification data to identify a user, the mobile device 102, and/or a vehicle associated with the mobile device 102. For example, the mobile device 102 may provide a Bluetooth identifier that may be used to perform a lookup by the vehicle information system 104 to determine the vehicle attributes associated with the data received from the mobile device 102. Embodiments are not limited in this manner, and the vehicle attribute may be determined and associated via other identifier(s), e.g., a username of an application, identifier of the mobile device, etc.

The vehicle anomaly detection system 106 may also determine environmental information relating to the real-time information received from the mobile device 102. For example, the vehicle anomaly detection system 106 may determine, via the environmental system 112, the environmental information based on location information.

In embodiments, the vehicle anomaly detection system 106 may determine a model to apply to the data to detect the anomaly. For example, the vehicle anomaly detection system 106 may utilize the vehicle make, vehicle model, vehicle year, and/or a combination thereof to determine the model to apply to the data. The vehicle anomaly detection system 106 may include different models based on any one or more items of the data and is not limited in this manner.

The vehicle anomaly detection system 106 may apply a trained model to the information and data and determine a result based on the application. For example, the model may indicate a probability that an anomaly is detected and identify the possible anomaly, e.g., there is a 75% probability that tires are worn, a 95% the breaks are worn, etc. Other results may include a probability of a road condition, e.g., 90% probability that a pothole is detected.

In embodiments, the vehicle anomaly detection system 106 may provide the result, in real-time or near real-time, back to the user. For example, the vehicle anomaly detection system 106 may indicate a mobile device 102 from which it received information and data. The indication may be communicated via an application, a text message, a voicemail message, etc. In some instances, the vehicle anomaly detection system 106 may send a result to another system, such as a system operated by the department of motor vehicle (DMV). For example, the result may indicate a hazardous road condition, e.g., a pothole, bad drainage, etc., that may need to be inspected by the DMV. In addition to providing a result of applying the model, the vehicle anomaly detection system 106 may update and retrain the model based on the new information and data received from the mobile device 102, the vehicle information system 104, and/or the environmental system 112. Thus, the models may become iteratively more accurate as more information and data is collected, and the models are updated.

Figure 2:
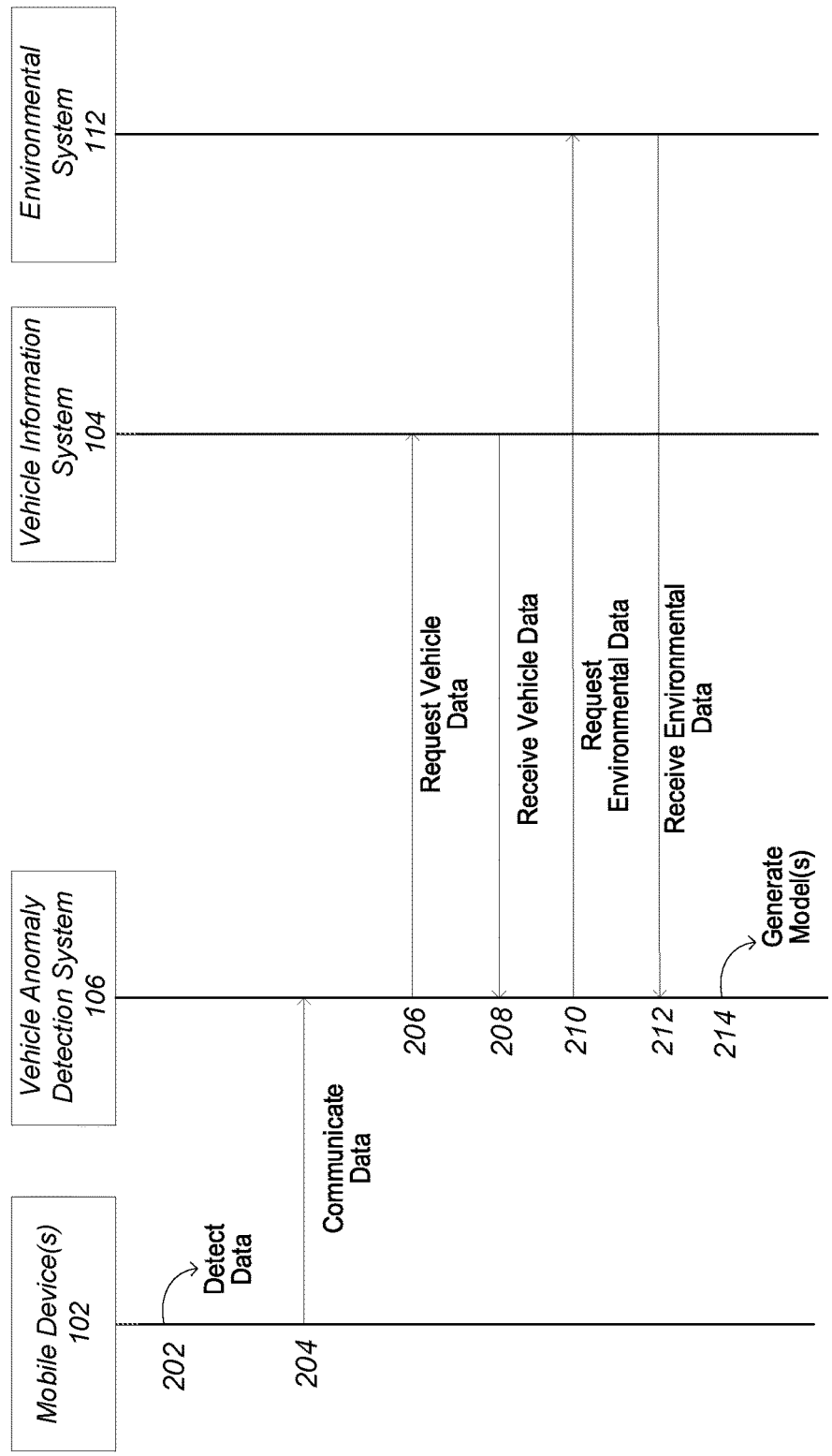
FIG. 2 illustrates an example of a communication flow to train machine-learning models in a vehicle anomaly detection environment.

FIG. 2 illustrates an example communication flow 200 to train machine-learning models in a vehicle anomaly detection environment. Although FIG. 2 illustrates the communication flow in a particular order, embodiments may not be limited in such a manner. For example, operations 206 and 210 may be communicated concurrently or near-simultaneously, and operation 210 is not dependent on receiving data at operation 208. Moreover, the communication flow 200 illustrates operations and communications between the devices and systems of system 100, e.g., mobile device(s) 102, vehicle anomaly detection system 106, vehicle information system 104, and environmental system 112. As previously illustrated and discussed in FIG. 1, these devices and systems may be coupled via one or more networks 108, which may include wired and wireless network and support secure and open communication protocols.

At operation 202, the mobile device(s) 102 may detect and determine data, such as sensor data collected and detected by one or more sensors of the mobile device(s) 102. The sensor data may include location data, axis-based motion data, orientation data, magnetic field data (compass), air pressure data, distance data, sound data, image data, etc., as previously discussed. The data may be detected periodically, semi-periodically, or randomly. The data may also be detected over a period of time, e.g., while the mobile device is: detected in a vehicle, enabled via an application, coupled with a vehicle Bluetooth device, moving over a threshold speed (30 miles/hour), and so forth. These event(s) and operations indicate that a person (and the mobile device 102) may be in a vehicle. The event(s) may be detected by an application, and the application may gather the data from the sensors based on the detection of the event(s).

In some instances, the mobile device(s) 102 may collect data from one or more sensors that may be collocated, but not incorporated in, the mobile device(s) 102. For example, the vehicle may include one or more sensors or devices that may be communicationally coupled with the mobile device (s) 102 in the vehicle. The sensors of the vehicle may also capture location data, axis-based orientation data, magnetic field data (compass), air pressure data, distance data, sound data, image data, etc. In addition, the vehicle may have additional sensors capable of collecting diagnostics of the vehicle. For example, the vehicle may include an onboard diagnostics device capable of determining the status of the vehicle systems and sub-systems. The onboard diagnostic device may collect engine data, transmission data, emissions data, powertrain data, environmental (HVAC) system data, brakes data, tire pressure data, chassis data, electronics status data, and so forth. The mobile device(s) 102 may receive the onboard diagnostic device data from the onboard diagnostic device and also provide it to the vehicle anomaly detection system 106. In some embodiments, the vehicle may include one or more sensors itself, e.g., a global position system (GPS) device to determine location data, an accelerometer to determine axis-based motion data, a gyroscope to determine orientation data, a magnetometer to determine magnetic field data (compass), a barometer to determine air pressure data, a proximity sensor to determine distance data, a microphone to determine sound data, and a camera to determine image data. These sensors and/or the onboard diagnostic device may communicate data with the vehicle anomaly detection system 106 via a mobile device 102 and/or directly through a wireless modem, cellular modem, etc.

At operation 204, the mobile device(s) 102 may communicate the data to the vehicle anomaly detection system 106. The data may include collected sensor data from the mobile devices and the vehicle, and the onboard diagnostic device data. In embodiments, a mobile device 102 may communicate with the vehicle anomaly detection system 106 in accordance with any communication protocol, wireless fidelity (WiFi), cellular, Bluetooth, satellite, etc. and using one or wireless and wired interconnects. Further, the data may be encrypted using any encryption protocol and/or compressed using a compression technique. The data may be sent periodically, semi-periodically, randomly, etc. In some instances, the data may be sent when the mobile device 102 has a WiFi connection so as not to use cellular data. Embodiments are not limited in this manner, and a user of the mobile device 102 may configure when the data is sent.

At operations 206, the vehicle anomaly detection system 106 may send a request for vehicle data to the vehicle information system 104. For example, the vehicle anomaly detection system 106 may provide information to the vehicle information system 104 such that it may perform one or more lookups to determine the attributes of the vehicle. In embodiments, the vehicle anomaly detection system 106 may provide the vehicle information system 104 an identifier(s) associated with a mobile device 102, e.g., a name, a device identifier, a phone number, a social media account identifier (Google, Facebook, Instagram, Twitter, etc.), a vehicle identification number (VIN), a Bluetooth identifier, etc. The identifier may be associated with and be used by the vehicle information system 104 to perform the one or more lookups, e.g., in datastore 110, to determine the attributes of the vehicle. At operation 208, the vehicle information system 104 may perform the lookup to determine the vehicle attributes, e.g., a vehicle make, a vehicle model, a vehicle year, vehicle part(s), vehicle history/repairs, etc., and provide them to the vehicle anomaly detection system 106.

At operation 210, the vehicle anomaly detection system 106 may send a request for environmental data to the environmental system 112. In embodiments, the vehicle anomaly detection system 106 may provide information, such as location data, in the request to the environment system 112 such that it may perform one or more lookups to determine environmental data. The environment system 112 may use the location data to determine weather information, road conditions, traffic, and so forth based on the location data during the time that it was collected. In embodiments, the environment system 112 may determine the environmental data and provide it to the vehicle anomaly detection system 106 at operation 212. The vehicle anomaly detection system 106 may utilize environmental data to generate models and detect vehicle anomalies.

At operation 214, the utilize the data from the mobile device(s) 102, the vehicle information system 104 and/or the environmental system 112 to generate one or more models to detect anomalies. As previously discussed, the machine-learning models may be supervised and/or unsupervised machine learning models. As will be discussed in more detail below in FIG. 3, the vehicle anomaly detection system 106 may detect anomalies with respect to vehicles by applying the trained model(s) to data received from a mobile device(s) 102 in real-time or near real-time.

Figure 3:
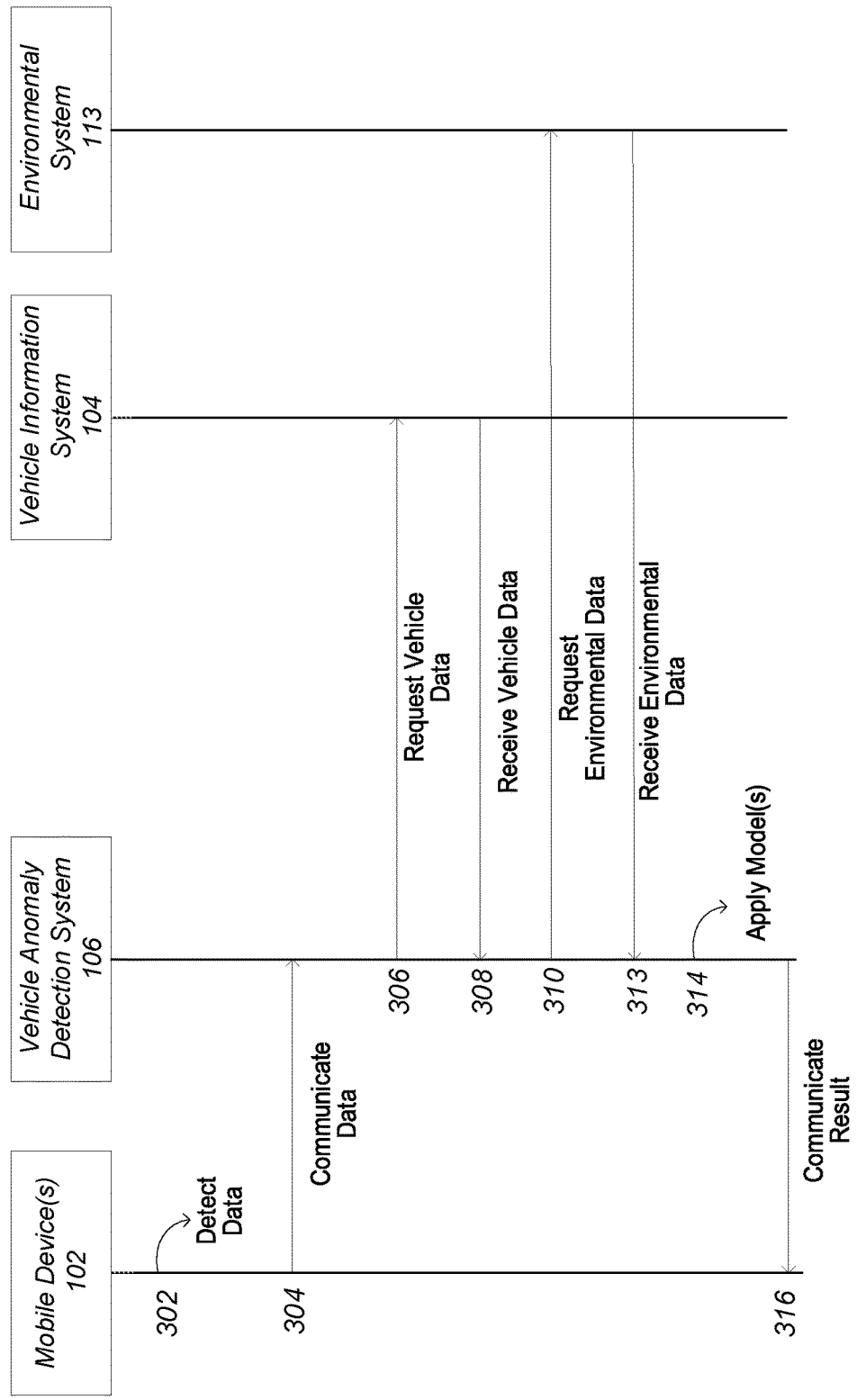
FIG. 3 illustrates a second example of a communication flow to apply machine-learning models to generate results.

FIG. 3 illustrates an example communication flow 300 that may be used to detect anomalies with trained machine-learning models in a vehicle anomaly detection environment. Although FIG. 3 illustrates the communication flow in a particular order, embodiments may not be limited in such a manner. Moreover, the communication flow 300 illustrates operations and communications between the devices and systems of system 100, e.g., mobile device(s) 102, vehicle anomaly detection system 106, vehicle information system 104, and environmental system 112. As previously illustrated and discussed in FIG. 1, these devices and systems may be coupled via one or more networks 108, which may include wired and wireless network and support secure and open communication protocols.

At operation 302, the mobile device(s) 102 may detect and determine data, such as sensor data collected and detected by one or more sensors of the mobile device(s) 102. As discussed, the sensor data may include location data, axis-based motion data, orientation data, magnetic field data (compass), air pressure data, distance data, sound data, image data, etc. The data may be detected periodically, semi-periodically, or randomly. The data may also be detected over a period of time and/or based on the event, e.g., while the mobile device is: detected in a vehicle, enabled via an application, coupled with a vehicle Bluetooth device, moving over a threshold speed (30 miles/hour), and so forth. Further, the mobile device(s) 102 may collect data from one or more sensors that may be collocated, but not incorporated in, the mobile device(s) 102. For example, the vehicle may include one or more sensors or devices and may also capture location data, axis-based orientation data, magnetic field data (compass), air pressure data, distance data, sound data, image data, and etc. The vehicle may include an onboard diagnostics device capable of determining the status of the vehicle systems and sub-systems, such as engine data, transmission data, emissions data, powertrain data, environmental (HVAC) system data, brakes data, tire pressure data, chassis data, electronics status data, and so forth. The mobile device(s) 102 may receive the onboard diagnostic device data from the onboard diagnostic device to provide to the vehicle anomaly detection system 106.

At operations 304, the mobile device(s) 102 may communicate the data to the vehicle anomaly detection system 106. The data may include collected sensor data from the mobile devices and vehicle and the onboard diagnostic device data. In embodiments, a mobile device 102 may communicate with the vehicle anomaly detection system 106 in accordance with any communication protocol and using one or wireless and wired interconnects. Further, the data may be encrypted using any encryption protocol and/or compressed using a compression technique.

At operations 306, the vehicle anomaly detection system 106 may send a request for vehicle data to the vehicle information system 104. For example, the vehicle anomaly detection system 106 may provide information to the vehicle information system 104 such that it may perform one or more lookups to determine the attributes of the vehicle. Further and at operation 308, the vehicle information system 104 may perform the lookup to determine the vehicle attributes, e.g., a vehicle make, a vehicle model, a vehicle year, vehicle part(s), vehicle history/repairs, etc., and provide the determine vehicle attributes to the vehicle anomaly detection system 106.

At operation 310, the vehicle anomaly detection system 106 may send a request for environmental data to the environmental system 112. In embodiments, the vehicle anomaly detection system 106 may provide information, such as location data, in the request to the environment system 112 such that it may perform one or more lookups to determine environmental data. The environment system 112 may use the location data to determine weather information, road conditions, traffic, and so forth based on the location data during the time that it was collected. In embodiments, the environment system 112 may determine the environmental data and provide it to the vehicle anomaly detection system 106 at operation 312.

At operation 314, the vehicle anomaly detection system 106 may apply a trained model to the information and data and determine a result. For example, the model may indicate a probability that an anomaly is detected and what the anomaly is, e.g., there is a 75% probability that tires are worn, a 95% the breaks are worn, etc. Other results may include a probability of a road condition, e.g., 90% probability there a pothole is detected.

At operation 316, the vehicle anomaly detection system 106 may provide the result, in real-time or near real-time, back to the user. For example, the vehicle anomaly detection system 106 may provide an indication to a mobile device 102 from which it received information and data. The indication may be communicated via, an application, a text message, a voicemail message, etc.

In some instances, the vehicle anomaly detection system 106 may send a result to another system, such as a system operated by the department of motor vehicle (DMV). For example, the result may indicate a hazardous road condition, e.g., a pothole, bad drainage, etc., that may need to be inspected by the DMV. In addition to providing a result of applying the model, the vehicle anomaly detection system 106 may update and retrain the model based on the new information and data received from the mobile device 102, the vehicle information system 104, and/or the environmental system 112. Thus, the models may become iteratively more accurate as more information and data is collected, and the models are updated.

Figure 4:
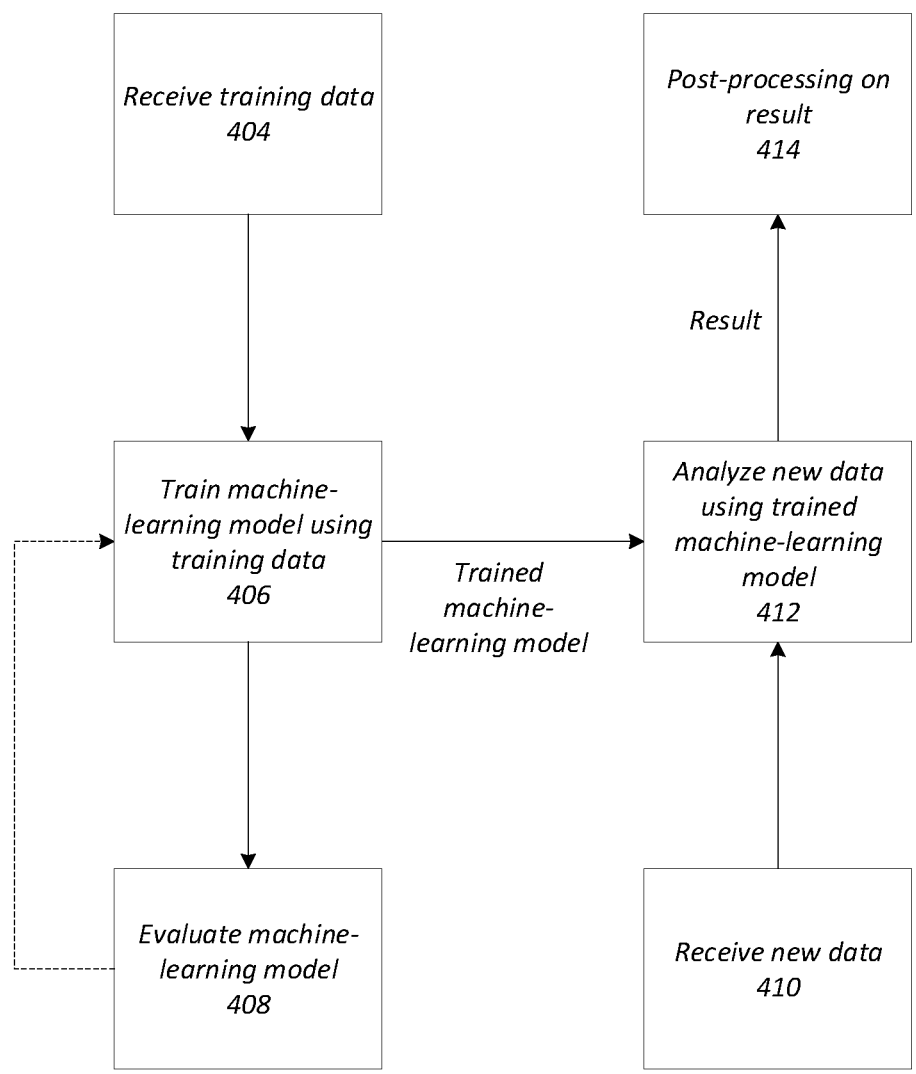
FIG. 4 illustrates an example of processing flow to perform machine-learning operations.

FIG. 4 is a flow chart of an example of a process 400 for generating and using a machine-learning model according to some aspects discussed herein, e.g., detecting anomalies and a probability of occurrence. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models can be constructed through an at least partially automated (e.g., with little or no human involvement) process called training, as previously discussed. During training, input data, such as the sensor data from a mobile device and/or vehicle, vehicle information, and/or environmental data, can be iteratively supplied to a machine-learning model to enable the machine-learning model to identify patterns related to the input data or to identify relationships between the input data and output data. As discussed, embodiments include utilizing supervised and/or unsupervised training. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. The training may also incorporate a clustering technique to cluster or classify data into groups, e.g., customers with similar profiles.

In block 404, training data is received. In some examples, the training data is received from a remote database or a local database (datastore(s) 110), constructed from various subsets of data, e.g., sensor data, vehicle attribute data, environmental data, etc. or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include historical data based on data previously collected. For example, the historical data may include information such as, historical sensor data, historical vehicle attribute data, historical environmental data, etc. The historical data may also include the profile of the previous collected data. This information may be used to train the models to predict future and/or real-time anomalies, for example. Embodiments are not limited in this manner.

In block 406, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 408, the machine-learning model is evaluated. For example, an evaluation dataset can be obtained, for example, via user input or from a database, e.g., datastore 110. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 406, where the machine-learning model can be further trained using additional training data or otherwise modified to improve accuracy. If the machine-learning model has an adequate degree of accuracy for the particular task, e.g., predicting anomalies, the process can continue to block 410.

In block 410, new data is received. In some examples, the new data is received from one or more mobile devices, the vehicle information system, and/or environmental system, as previously discussed. The new data may be unknown to the machine-learning model. For example, the machine-learning model may not have previously processed or analyzed the new data. The new data may include information about a vehicle and current environmental conditions, for example.

In block 412, the trained machine-learning model is used to analyze the new data and provide a result, a detected anomaly and probability of occurrence. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 414, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

FIG. 5 illustrates an example of a logic flow 500 to train a machine-learning model to detect anomalies for vehicles. FIG. 5 illustrates an example of a logic flow 500 that may be representative of some or all of the operations executed by one or more embodiments and systems described herein, such as those discussed above in FIGS. 1-4.

At block 505, the logic flow 500 includes determining vehicle data for a plurality of vehicles to perform training for a machine-learning model. In embodiments, the vehicle data may include information and data collected by one or more input devices of mobile devices. The one or more input devices may perform detections to collect the data while the mobile devices are in vehicles. Thus, the vehicle data may be crowdsourced across many different users, mobile devices, and vehicles to provide diversity for the training dataset. The vehicle data may be stored in a datastore and retrieved from the datastore to perform the training for a machine-learning model.

Further and at block 510, the logic flow 500 includes determining vehicle attributes for the plurality of vehicles. The vehicle attributes are attributes for each vehicle used as part of the vehicle data collection described above. The vehicle attributes may include a vehicle make, a vehicle model, a vehicle year, vehicle part(s), and vehicle history/repairs for each of the vehicles. Each vehicle attribute may be associated with a particular vehicle and may be retrieved from a datastore based on information in the vehicle data for the particular vehicle, e.g., a user identifier, a Bluetooth identifier, a VIN, etc.

At block 515, the logic flow 500 includes determining environmental data associated with the vehicle data. The environmental data may include weather data, road condition data, construction data, etc. and is stored in a datastore. Each datapoint of the environmental data may also correspond to the collection of the vehicle data. Moreover, each datapoint of the environmental data may be associated with a particular vehicle and may be retrieved from a datastore based on information in the vehicle data for the particular vehicle, e.g., a user identifier, a Bluetooth identifier, a VIN, etc.

In embodiments, the vehicle data, the vehicle attributes, and the environmental data may make up a training dataset that may be used to train one or more model. For example, at block 520, the logic flow includes training a machine-learning model with the vehicle data, the vehicle attributes, and the environmental data, and the machine-learning model may be trained to detect anomalies associated with vehicles.

The logic flow 500 describes training a machine-learning model utilizing a training dataset including real data, e.g., collected by mobile devices in vehicles and data associated with those vehicles. In some embodiments, the training dataset may be preprocessed to anonymize the data. In other instances, the vehicle data may be simulated or computer-generated data. For example, simulated data may include computer-generated location data, computer-generated axis-based motion data, computer-generated orientation data, computer-generated magnetic field data (compass), computer-generated air pressure data, computer-generated distance data, computer-generated sound data, and computer-generated image data.

In embodiments, the training dataset may also include known results, report anomalies or problems with vehicles, road conditions, weather conditions, etc. In these instances, the training may be supervised machine-learning. In other instances, the training dataset may not include results, and unsupervised machine-learning may be performed.

FIG. 6 illustrates an example of a logic flow 600 to process data with a trained machine-learning model to detect anomalies for at least one vehicle. FIG. 6 illustrates an example of a logic flow 600 that may be representative of some or all of the operations executed by one or more embodiments and systems described herein, such as those discussed above in FIGS. 1-4.

In embodiments and at block 605, the logic flow 600 includes receiving real-time vehicle data from a mobile device. In embodiments, the real-time vehicle data may be associated with and/or include data of one or more real-time detections made by one or more input devices of the mobile device. For example, a mobile device may include any number of sensor devices, as previously discussed, that may capture real-time or near real-time data and provide the data to a vehicle anomaly detection system. In embodiments, the real-time vehicle data may be communicated to the system via one or more wireless and/or wired networks, e.g., via wireless cellular communication from the mobile device, wired and wireless cellular communication via a cellular network, and/or any other communication network (WiFi/Internet). Embodiments are not limited in this manner.

At block 610, the logic flow 600 includes determining vehicle attributes and environmental data associated with the vehicle data. For example, a vehicle anomaly detection system may perform one or more lookups and/or send one or more requests for the vehicle attributes and environmental data to other systems, such as the vehicle information system, environmental system, and/or one or more datastores. Note that in some instances, one or more of the vehicle attributes and/or environmental data may be provided in the real-time vehicle data from the mobile device.

At block 615, the logic flow 600 determining a machine-learning model for the real-time vehicle data. In some instances, the machine-learning model may be associated with and/or trained on at least one vehicle attribute matching one of the determined vehicle attributes associated with the real-time vehicle data. For example, the machine-learning model to score the real-time data may be determined and trained on data from vehicles having one or more of vehicle make, model, year, and/or a combination thereof. Embodiments are not limited in this manner, for example, the determination of the machine-learning model may also be selected based on similar and/or same environmental data, e.g., raining vs. dry conditions.

At block 620, the logic flow 600 includes applying the machine-learning model to the real-time vehicle data, vehicle attributes, and environmental data to determine a result. For example, the machine-learning model may process the real-time vehicle data, vehicle attributes, and/or environmental data to produce a result, e.g., an indication of a likelihood of an anomaly and/or an indication of what the anomaly may be. For example, the result may indicate that there is an 85% chance that the engine is misfiring. Embodiments are not limited in this manner.

At block 625, the logic flow 600 includes determining whether an anomaly is detected for the vehicle based on the result of applying the machine-learning model to the real-time vehicle data, vehicle attributes, and environmental data. If an anomaly is detected, the system may cause an indication to be sent to the mobile device, another device associated with the owner and/or operator of the vehicle, and/or a device of the vehicle.

Figure 7:
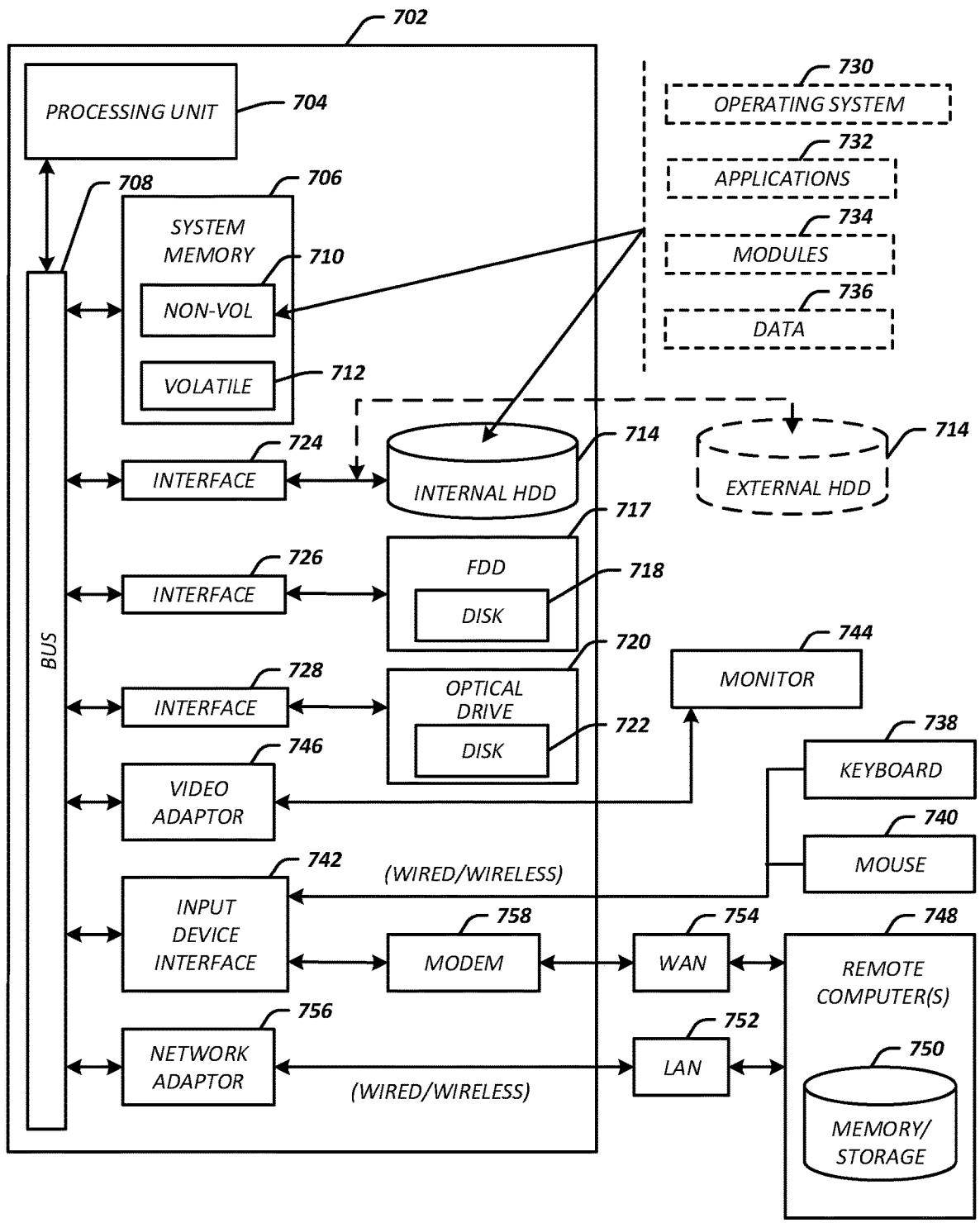
FIG. 7 illustrates an example of a computer architecture representative of one or more systems and devices discussed herein.

FIG. 7 illustrates an embodiment of an exemplary computing architecture 700 that may be suitable for implementing an apparatus, system, and/or method for performing operations associated with implementation of one or more of the disclosed techniques. In various embodiments, the computing architecture 700 may comprise or be implemented as part of an electronic device and/or system discussed herein.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704. In some embodiments, processing circuitry of processing unit 704 and/or other processing circuitry of computing architecture 700 may be operative to perform operations associated with logic flow 500 and/or logic flow 600, and/or other operations associated with implementation of one or more of the disclosed techniques. In some embodiments, such processing circuitry may be coupled to a network interface of computing architecture 700.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   determining, by a processor executing instructions, vehicle data for a plurality of vehicles, the vehicle data based on detections made by input devices of a plurality of mobile devices detected within the plurality of vehicles;
   determining, by the processor and from at least one datastore, vehicle attributes for the plurality of vehicles, at least a portion of the vehicle attributes for the plurality of vehicles retrieved from the at least one datastore based on information of the vehicle data;
   determining, by the processor and from the at least one datastore, environmental data associated with the vehicle data, at least a portion of the environmental data retrieved from the at least one datastore based on location data associated with each of the plurality vehicles collected during the detections;
   training, by the processor executing the instructions, a machine-learning model with the vehicle data, the vehicle attributes, and the environmental data, the machine-learning model trained to detect anomalies associated with the plurality of vehicles, and wherein the training includes applying a clustering technique to the vehicle data, the vehicle attributes, and the environmental data to generate one or more clusters of data, and the one or more clusters of data generated based on one or more of vehicle make, vehicle model, vehicle year, trim package, weather conditions, road conditions, or any combination thereof;
receiving real-time vehicle data associated with a real-time detection made by at least one device of a mobile device;
determining real-time vehicle attributes from the at least one datastore utilizing an identifier associated with the mobile device;
determining real-time location data associated with the real-time detection;
determining, from the at least one datastore and utilizing the real-time location data, real-time environmental data; and
applying the machine-learning model to the real-time vehicle data, the real-time vehicle attributes, and the real-time environmental data to determine whether an anomaly is detected.

2. The computer-implemented method of claim 1, wherein training the machine-learning model includes unsupervised machine-learning training without known results and the machine-learning model is an unsupervised machine-learning model.

3. The computer-implemented method of claim 1, wherein training the machine-learning model includes supervised machine-learning training with known results and the machine-learning model comprises a supervised machine-learning model.

4. The computer-implemented method of claim 1, wherein the mobile device is associated with a vehicle and the identifier identifies the vehicle, and the method comprising:
determining the anomaly is detected based on applying the model to the real-time vehicle data.

5. The computer-implemented method of claim 4, comprising causing communication of an alert in response to determining that the anomaly is detected.

6. The computer-implemented method of claim 4, wherein the real-time vehicle data comprises at least one of the real-time location data, axis-based motion data, orientation data, magnetic field data, air pressure data, distance data, sound data, image data, or any combination thereof.

7. The computer-implemented method of claim 6, comprising applying a filter to sound data of the real-time environmental data, the filter to filter out sound in a specified frequency range.

8. The computer-implemented method of claim 4, comprising determining to apply the machine-learning model to the real-time vehicle data based on one or more of the vehicle attributes for the real-time vehicle data matching the vehicle attributes.

9. The computer-implemented method of claim 4, comprising:
retraining the machine-learning model utilizing the real-time vehicle data, the real-time vehicle attributes, and the real-time environmental data.

10. The computer-implemented method of claim 1, wherein the vehicle attributes comprise the vehicle make, the vehicle model, the vehicle year, a vehicle part, vehicle repair history, or a combination thereof, the environment data comprises weather data, road condition data, construction data, or combination thereof.

11. A system, comprising:
a computer processor; and
a memory to store instructions which when executed by the computer processor cause the computer processor to:
retrieve vehicle data and vehicle attributes from one or more datastores, wherein the vehicle data and vehicle attributes are associated with a plurality of vehicles, and the vehicle data is at least partially based on detections made by input devices of each of a plurality of mobile devices associated with the plurality of vehicles;
retrieve environmental data from the one or more datastores based on location data associated and collected during the detections, wherein the environmental data comprising weather conditions, road conditions, or combination thereof;
train a plurality of machine-learning models, wherein each of the machine-learning models trained to detect anomalies associated with the plurality of vehicles, and wherein the training applied to each of the models includes applying a clustering technique to the vehicle data, the vehicle attributes, and the environmental data to generate one or more clusters of data, and the one or more clusters of data generated based on one or more of vehicle make, vehicle model, vehicle year, trim package, the weather conditions, the road conditions, or any combination thereof;
receive real-time vehicle data associated with a real-time detection made by at least one device of a mobile device;
determine real-time vehicle attributes from the at least one datastore utilizing an identifier associated with the mobile device;
determine real-time location data associated with the real-time detection;
determine, from the at least one datastore and utilizing the real-time location data, real-time environmental data; and
apply the machine-learning model to the real-time vehicle data, the real-time vehicle attributes, and the real-time environmental data to determine whether an anomaly is detected.

12. The system of claim 11, wherein training the plurality of machine-learning models includes unsupervised machine-learning training without known results and the plurality of machine-learning models are unsupervised machine-learning models.

13. The system of claim 11, wherein training the machine-learning models includes supervised machine-learning training with known results and the machine-learning models comprises supervised machine-learning model.

14. A system, comprising:
a computer processor; and
a memory storing instructions, which when executed by the computer processor, cause the computer processor to:
receive real-time vehicle data comprising real-time location data from a mobile device, the real-time vehicle data associated with one or more real-time detections made by one or more input devices of the mobile device;
determine an identifier associated with the mobile device;
determine real-time vehicle attributes associated with the real-time vehicle data utilizing the identifier;
determine real-time environmental data from an environmental system utilizing the real-time location data, wherein the real-time environmental data comprises real-time road conditions, real-time weather conditions, or combination thereof;

determine a machine-learning model for the real-time vehicle data, wherein the machine-learning model trained to detect anomalies associated with vehicles, and wherein the training includes applying a clustering technique to vehicle data, vehicle attributes, and environmental data to generate one or more clusters of data, and the one or more clusters of data generated based on one or more of vehicle make, vehicle model, vehicle year, trim package, weather conditions, road conditions, or any combination thereof;

apply the machine-learning model to the real-time vehicle data, the real-time vehicle attributes, and the real-time environmental data to determine a result; and determine whether an anomaly is detected for a vehicle based on the result.

15. The system of claim 14, wherein the instructions further cause the computer processor to train a plurality of machine-learning models including the machine-learning model, each of the plurality of machine-learning models trained using the vehicle data, the vehicle attributes, and the environmental data associated with a plurality of vehicles.

16. The system of claim 14, wherein the instructions further cause the computer processor to cause communication of an alert to the mobile device in response to the determination.

17. The system of claim 14, wherein the real-time vehicle data comprises at least one of real-time location data, axis-based motion data, orientation data, magnetic field data, air pressure data, distance data, sound data, image data, and/or any combination thereof.

18. The system of claim 14, the real-time vehicle attributes comprise at least one of the vehicle make, the vehicle model, the vehicle year, a vehicle part, or a vehicle repair history, and/or any combination thereof, and the real-time environment data comprises at least one of weather data, road condition data, or construction data, and/or a combination thereof.

19. The system of claim 14, wherein the instructions further cause the computer processor to retrain the machine-learning model utilizing the real-time vehicle data, the real-time vehicle attributes, and the real-time environmental data.

20. The system of claim 14, wherein the identifier comprises one of a name, a phone number, a Bluetooth identifier, or a vehicle identification number (VIN), and wherein the instructions further cause the computer processor to determine the real-time vehicle attributes with the identifier from a bank system configured to store the vehicle attributes based on a loan or finance application to purchase the vehicle.

* * * * *